US009293134B1

United States Patent
Saleem et al.

(10) Patent No.: US 9,293,134 B1
(45) Date of Patent: Mar. 22, 2016

(54) SOURCE-SPECIFIC SPEECH INTERACTIONS

(71) Applicant: Amazon Technologies, Inc., Seattle, WA (US)

(72) Inventors: Shirin Saleem, Belmont, MA (US); Shamitha Somashekar, Cupertino, CA (US); Aimee Therese Piercy, Mountain View, CA (US); Kurt Wesley Piersol, San Jose, CA (US); Marcello Typrin, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/502,103

(22) Filed: Sep. 30, 2014

(51) Int. Cl.
*G10L 15/18* (2013.01)
*G10L 15/26* (2006.01)
*G10L 13/00* (2006.01)

(52) U.S. Cl.
CPC ............... *G10L 15/18* (2013.01); *G10L 13/00* (2013.01); *G10L 15/26* (2013.01)

(58) Field of Classification Search
None
See application file for complete search history.

(56) References Cited

U.S. PATENT DOCUMENTS

| 5,737,485 A * | 4/1998 | Flanagan | G10L 15/16 704/232 |
| 8,019,089 B2 * | 9/2011 | Seltzer | G10L 21/0208 381/71.1 |
| 2002/0065651 A1 * | 5/2002 | Kellner | G06F 17/28 704/231 |
| 2003/0004728 A1 * | 1/2003 | Keiller | G06F 3/16 704/275 |
| 2008/0201139 A1 * | 8/2008 | Yu | G10L 15/063 704/231 |

* cited by examiner

*Primary Examiner* — Jeremiah Bryar
(74) *Attorney, Agent, or Firm* — Lee & Hayes, PLLC

(57) ABSTRACT

A speech system may be configured to operate in conjunction with a stationary base device and a handheld remote device to receive voice commands from a user. Voice commands may be directed either to the base device or to the handheld device. When performing automatic speech recognition (ASR), natural language understanding (NLU), dialog management, text-to-speech (TTS) conversion, and other speech-related tasks, the system may utilize various models, including ASR models, NLU models, dialog models, and TTS models. Different models may be used depending on whether the user has chosen to speak into the base device or the handheld audio device. The different models may be designed to accommodate the different characteristics of audio and speech that are present in audio provided by the two different components and the different characteristics of the environmental situation of the user.

23 Claims, 4 Drawing Sheets

SOURCE-SPECIFIC SPEECH INTERACTIONS

BACKGROUND

As the processing power available to devices and associated support services continues to increase, it has become practical to interact with users in new ways. In particular, it has become practical to interact with users through two-way speech dialogs, in a which user instructs a system by voice and the system responds by speech.

Although it is possible in many environments to reliably recognize and understand user speech, certain environments, particularly environments containing higher levels of non-voice interference, may make speech recognition and understanding difficult.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
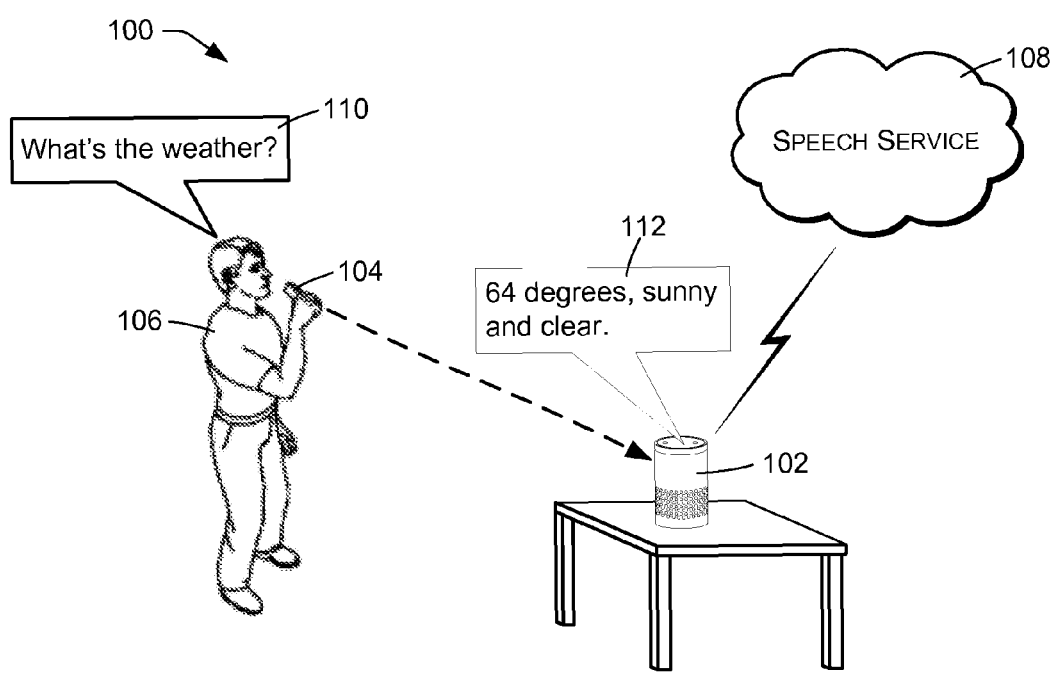
FIG. 1 shows an illustrative speech-based system that includes a base device, a handheld device, and a cloud-based speech service.

A speech-based system may be configured to interact with a user through speech to receive instructions from the user and to provide services for the user. The system may have a stationary base device and a portable, handheld remote device, each of which may have a microphone for capturing audio containing user speech. The user may give instructions to the system by directing speech to either the base device or the remote handheld device.

The audio captured by the base device and handheld device is provided to a speech service for automatic speech recognition (ASR) and natural language understanding (NLU) to determine meanings of user speech. The speech service is configured to respond to user speech by performing actions, providing services, or conducting further dialogs with the user by generating speech for playback by the base device.

The microphones of the base device may be designed to capture far-field, omnidirectional sounds so that the voice of the user may be captured regardless of the position of the user relative to the base device. However, this may result in other interfering sounds also being present in the audio produced by the base device. The microphone of the handheld device may be designed to capture near-field, directional sounds, such as the voice of a user when the handheld device is held near and pointing toward the user's mouth, and to exclude or reject far-field noise coming from other positions. The user may choose to speak into the handheld device in noisy situation, where it may be more difficult for the system to analyze the user's voice in the audio signals generated by the base device.

ASR, NLU, and speech generation may be based on corresponding ASR models, NLU models, and text-to-speech (TTS) models. One set of models may be used when processing and/or responding to audio provided by the handheld device, while another set of models may be used when processing and/or responding to audio provided by the base device.

When processing audio provided by the handheld device, for example, ASR and NLU models may be optimized for use with a near-field audio signal that is predominated by user speech and that contains relatively little non-voice interference. In addition the ASR and NLU models may be produced or trained to work well on audio that is received through an audio channel that includes the microphone of the handheld device and the transmission path from handheld device. When processing audio provided by the base device, on the other hand, the ASR and NLU models may be optimized for use with relatively noisy signals that contain more significant non-voice interference in relation to the user speech, and for the audio channel through which the base device signal is received.

Different TTS models or methods may also be used, determining on whether user speech is received from the handheld device or the base device. For example, speech may be generated at a higher volume when user instructions are received from the handheld device, under the assumption that the user has chosen to user the handheld device because of high levels of ambient noise.

FIG. 1 shows an example speech-based system 100 having a base device 102 and a remote, handheld device 104. The speech-based system 100 may be implemented within an environment such as a room or an office, and a user 106 is shown as interacting with the speech-based system 100.

The base device 102 may in some embodiments comprise a network-based or network-accessible speech interface device having one or more microphones, a speaker, and a network interface or other communications interface. The base device 102 is designed to be positioned on a surface, in a fixed or stationary location.

The handheld device 104 may comprise a remote controller that is held by the user at a variable position relative to the base device 102, having a microphone that is held near and directed toward the mouth of the user 106. The handheld device 104 is designed to be moved about the environment relative to the location of the base device 102.

The handheld device 104 may be configured to communicate with the base device 102 using a personal-area network (PAN) such as Bluetooth®. A user may speak into the microphone of the handheld device 104 in order to issue spoken commands to the system 100. In some cases, the handheld device 104 may have a push-to-talk (PTT) actuator or button that the user 106 pushes or actuates when speaking to the system 100.

The microphone of the handheld device 104 may be designed to be held near the mouth of the user 106 and to capture near-field sounds that originate from very near the microphone. The microphone of the handheld device 104 may also be directional in order to provide further rejection of non-voice sounds or interference originating from sources other than the mouth of the user.

The microphones of the base device 102, on the other hand, may be designed to capture far-field sounds originating from further distances, and may produce audio signals having relatively higher levels of non-voice interference than the audio signal generated by the handheld device 104. Although audio beamforming may be used by the base device 102 to provide directional audio signals, even such directional signals may have higher levels of non-voice interference resulting from far-field sources such as televisions, radios, media players, mechanical devices such as fans, and so forth.

The speech-based system 100 may include a speech service 108 that receives real-time audio or speech information from the base device 102 in order to detect user utterances, to determine user meanings or intents based on the utterances, and/or to perform actions or provide services in fulfillment of the meanings or intents. The speech service 108 may also generate and provide speech and other audio for playback by the base device 102. In some cases, the speech service 108 may conduct speech dialogs with the user 106 using the microphone and speaker capabilities of the base device 102. A speech dialog may comprise an alternating sequence of user utterances and system speech responses.

The speech service 108 may in some embodiments be implemented as a network-based or cloud-based service. Communications between the base device 102 and the service 108 may be implemented through various types of data communications networks, including local-area networks, wide-area networks, and/or the public Internet. Cellular and/or other wireless data communications technologies may also be used for communications. The speech service 108 may serve a large number of base devices and associated handheld devices, which may be located in the premises of many different users.

The speech service 108 may be configured to interact with the user 106 through the base device 102 to determine a user intent and to provide a function or service in response to or in fulfillment of the user intent. Provided services may include performing actions or activities, rendering media, obtaining and/or providing information, providing information via generated or synthesized speech via the base device 102, initiating Internet-based services on behalf of the user 106, and so forth.

The speech service 108 may in some instances be part of a network-accessible computing platform that is maintained and accessible via the Internet. Network-accessible computing platforms such as this may be referred to using terms such as "on-demand computing", "software as a service (SaaS)", "platform computing", "network-accessible platform", "cloud services", "data centers", and so forth.

In FIG. 1, the user 106 is shown communicating with the speech service 108 by speaking into the microphone of the handheld device 104. In this example, the user is asking an audible question, "What's the weather?", as represented by the dialog bubble 110. Alternatively, the user 106 may speak in the direction toward the base device 102 without using the handheld device 104. The speech service 108 may respond to input from either the handheld device 104 or the base device 102. When using the handheld device 104 for speech input, the user presses a push-to-talk button on the handheld device 104 to indicate that he or she is making an utterance that is intended to be recognized and interpreted as a system query or command. When directing speech toward the base device 102, the user speaks a keyword to provide an alert that subsequent speech is directed to the system 100. A keyword may also be referred to as an "attention" word or an "alert" word.

In response to the spoken query, the system 100 may respond with generated speech as indicated by the dialog bubble 112. The response may be generated by the speech service 108 and played by the base device 102. In this example, the response indicates, in response to the user's query, that the weather is "64 degrees, sunny and clear."

Alternatively, the system 100 may respond with a question in order to clarify the intent of the user, and the user may respond again by speech. A sequence such as this is referred to as a speech dialog. Each user utterance and system speech response is referred to as a "turn" of the dialog. Each turn may be initiated by the user speaking into the handheld device 104 or into the base device 102. When initiating a turn, the user 106 may speak through one or the other of the handheld device 104 or the base device 102, even within a single dialog.

Functionally, one or more audio signals are provided from the base device 102 and/or the handheld device 104. In the described embodiment, one or more microphones of the base device 102 capture far-field audio and provide a far-field audio signal or stream to the speech service 108. One or more microphones of the handheld device 104 capture near-field audio and provide a near-field audio signal or stream to the base device 102, which relays the near-field audio signal to the speech service 108. When the speech service 108 receives an audio signal, the audio signal is tagged or labeled to indicate whether it was captured by the base device 102 or by the handheld device 104.

The provided audio signals from the base device 102 and the handheld device 104 may be processed by the speech service 108 in various ways to determine the meaning of the user's query and/or the intent expressed by a user statement. For example, the speech service 108 may implement automated speech recognition (ASR) to obtain a textual representation of user speech that occurs within the audio. The ASR may be followed by natural language understanding (NLU) to determine the meaning or intent expressed by the text of the user speech. The speech service 108 may also have command execution functionality to compose and/or implement commands in fulfillment of determined user intent. Such commands may be performed by the speech service 108 either independently or in conjunction with the base device 102, such as by generating audio that is subsequently rendered by the base device 102. In some cases, the speech service 108 may generate a speech response, which may be sent to and rendered by the base device 102.

Analyzing and responding to audio containing user speech may be performed in different ways, depending on whether the audio has been captured and provided by the handheld device 104 or by the base device 102. More specifically, ASR and NLU models may be tailored to the different characteristics of the audio signals and speech provided by the handheld device 104 and the base device 102, respectively, and to the situation reflected by the user's choice between the handheld device 104 and the base device 102. Generally, first ASR models and first NLU models are produced and/or trained using far-field audio signals such as the audio signals produced by the base device 104. Second ASR models and second NLU models are produced and/or trained using near-field audio signals such as the audio signals produced by the handheld device 102

In addition to acting as a speech interface, the base device 102 may provide other types of capabilities and functionality for the benefit of the user 106. For example, the base device 102 may act as a media device for playing music, video, or other content.

Although the speech service 108 is described in the preceding discussion as comprising a network-based service, the speech service 108 may alternatively be implemented as part of the base device 102. Furthermore, in some implementations the functionality attributed above to the speech service 108 may be distributed across different components such as the base device 102, the handheld device 104, one or more computer servers that are part of a network-based or network-accessible service, and/or any other associated or supporting devices.

Figure 2:
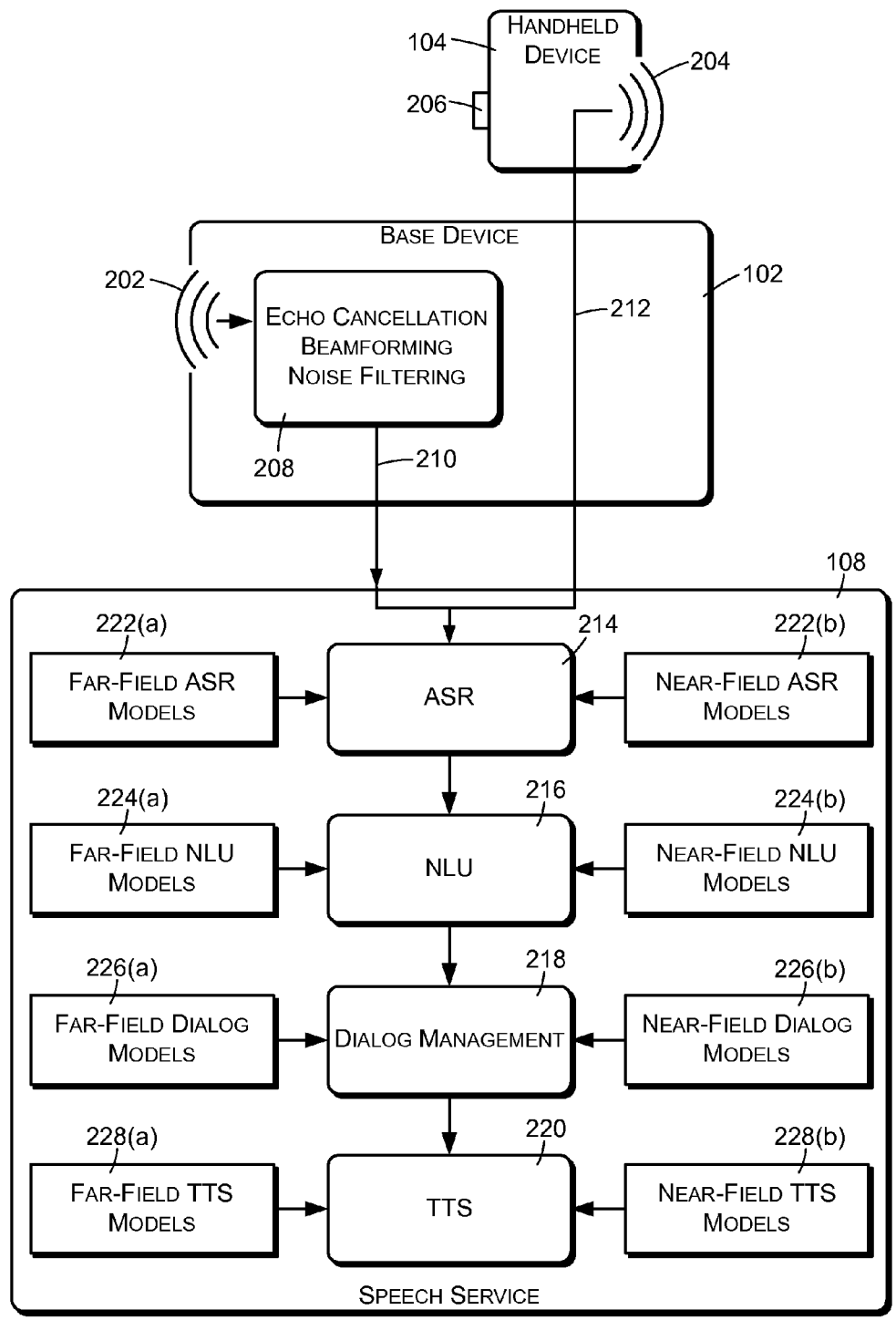
FIG. 2 is a block diagram showing relevant functional components of the speech-based system of FIG. 1.

FIG. 2 illustrates logical functionality of the system 100 in an example implementation. The base device 102 has a far-field microphone component 202 for capturing far-field audio containing user speech. In some cases, the microphone component 202 may comprise an array of multiple microphones suitable for use with directional beamforming and/or sound source localization. In other cases, the microphone component may comprise one or more omni-directional microphones that generate a signal containing sound from different directions and distances relative to the base device 102.

The handheld device 104 has a near-field microphone 204 for capturing near-field audio containing user speech. In some cases, the microphone 204 may also be a directional microphone in order to emphasize sound coming from the direction of the user's mouth.

The handheld device 104 also has a push-to-talk (PTT) button or other type of actuator 206 that the user may press or actuate to indicate that he or she is intending to speak into the microphone 204 of the handheld device 104. In some cases, the handheld device 104 may have other buttons or user interface elements, such as a keypad containing number keys, media control keys, content navigation keys, and so forth.

The base device 102 may have audio processing components 208 for processing one or more audio signals produced by the far-field microphone component 202 of the base device 102. The audio processing components 208 may perform echo cancellation, beamforming, noise filtering, and other functions, resulting in a base device audio signal 210 that is provided to the speech service 108. In some embodiments the base device audio signal 210 may comprise a directional signal produced by audio beamforming techniques to emphasize sound from a selected direction, such as the direction of the user 106 relative to the base device 102.

The handheld device 204 provides a remote device audio signal 212 to the base device 102 using Bluetooth® or another device-to-device communications protocol. The remote device audio signal 212 is received by the base device 102 and provided or relayed to the speech service 108. In certain embodiments, the remote device audio signal 212 may be provided directly to the speech service 108 from the handheld device 104 using available network communications, without going through the base device 102.

In certain implementations, the base device 102 may provide either the base device audio signal 210 or the remote device audio signal 212 to the speech service 108 at any given time, depending on whether the user is directing speech to the base device 102 or the handheld device 104. For example, the base device audio signal 210 may be provided to the speech service 108 after a preconfigured keyword or wake word is detected by the base device 102 as having been spoken by the user 106. The remote device audio signal 212 may be provided to the speech service 108 during times when the PTT button 206 is pressed by the user 106. When providing one or the other of the base device audio signal 210 or the remote device audio signal 212, the base device 102 may provide an indication to the speech service 108 regarding which of the audio signals is being provided.

The base device audio signal 210 is provided through an audio channel that includes the microphone 202, the audio processing components 208, the transmission path between the base device 102 and the speech service 108. The remote device audio signal 212 is provided through an audio channel that includes the microphone 204, the transmission path between the remote device 104 and the base device 106, the transmission path between the base device 102 and the speech service 108, and any components that act upon the audio signal 212.

In some implementations, pressing the PTT button 206 at any time may cause the base device audio signal 210 to be interrupted or stopped, and replaced by the remote device audio signal 212. For example, suppose that the user has spoken the preconfigured keyword and the base device 102 has started providing the base device audio signal 210 to the speech service 108. In response to the user pressing the PTT button 206, the base device 102 may stop providing the base device audio signal 210 and may start providing the remote device audio signal 212 to the speech service 108.

In other embodiments, the speech service 108 may continuously receive one or both of the base device audio signal 210 and the remote device audio signal 212.

The speech service 108 may have an automatic speech recognition (ASR) component 214 that recognizes human speech in audio signals provided by the base device 102 and/or the handheld device 104, including either or both of the base device audio signal 210 and the remote device audio signal 212. The speech service 108 may also have a natural language understanding (NLU) component 216 that determines the meaning or intent of user speech that is recognized by the ASR component 214.

The speech service 108 may also provide a dialog management component 218 configured to coordinate speech dialogs or interactions with the user 106. Speech dialogs may be used to determine or clarify user intents by asking the user 106 for information using speech prompts. The dialog management component may at times generate speech that is responsive to user speech.

The speech service 108 may further include a text-to-speech (TTS) component 220 that synthesizes or otherwise produces speech audio under the control of the dialog management component 218. For example, the TTS component 220 may produce speech to be played on the speaker of the base device 102.

The components described above may function based on different types of models or rules. For example, the ASR component 214 may base its functionality on ASR models 222, which may include acoustic models created by means of various training techniques. Similarly, the NLU component 216 may utilize NLU models 224 that specify grammar, lexicons, phrases, responses, and so forth, and which also may be created by training.

The dialog management component 218 may utilize dialog models 226 that specify logic for generating speech content, statements, or questions, and for thereby conducting dialogs with users. A dialog comprises an alternating sequence of natural language statements or utterances by the user 106 and system generated speech or textual responses. The dialog models 226 embody logic for creating speech responses based on received user statements in order to prompt the user for more detailed information regarding intents or to obtain other information from the user.

The TTS component 220 may utilize TTS models 228 that govern characteristics of generated speech such as choice of voices, loudness, etc.

Different models may be used depending on whether the base device audio signal 210 or the remote device audio signal 212 is being received and/or acted upon. Specifically, the ASR component 214 uses far-field ASR models 222(*a*) when receiving and recognizing speech in the base device audio signal 210 and near-field ASR models 222(*b*) when receiving and recognizing speech in the remote device audio signal 212. The NLU component 216 uses far-field NLU models 224(*a*)

when the speech service 108 is interpreting speech in the device audio signal 210 and near-field NLU models 224(*b*) when the speech service 108 is interpreting speech in the remote device audio signal 212. The dialog management component 218 uses far-field dialog models 226(*a*) when responding to speech in the base device audio signal 210 and near-field dialog models 226(*b*) when responding to speech in the remote device audio signal 212. The TTS component 220 uses far-field TTS models 228(*a*) when receiving the base device audio signal 210 is being provided to the speech service 108 and near-field TTS models 228(*b*) when the remote device audio signal 212 is being provided to the speech service 108.

The far-field ASR models 222(*a*) may be produced and optimized for the audio channel of the base device audio signal 210, and for use with relatively noisy far-field audio signals, in which the presence of the user voice may be relatively weak relative to interfering sounds. The near-field ASR 222(*b*) models may be produced and optimized for the audio channel of the remote device audio signal 212, and for use with near-field audio signals that contain less far-field noise and in which the presence of the user voice is relatively strong. In addition, the far-field and near-field ASR models 222(*a*) and 222(*b*) may be designed to account for different ways that users may speak when using either the base device 102 or the handheld device 104. When using the base device 102, for example, users may tend to speak loudly, in a particular tone of voice. When using the handheld device, users may tend to speak more quietly and in a more relaxed tone. The ASR models 222(*a*) and 222(*b*) may be designed to account for such differences.

The ASR models 222 may evaluate recognition results in terms of confidence levels or scores, which indicate the likely accuracy of given recognition results. The ASR models 222 may compare confidence scores of recognition results to a threshold, and may accept recognition results only when confidence scores are above the threshold. In the described embodiments, the far-field ASR models 222(*a*) may be configured to use a first, relatively high recognition confidence score threshold, while the near-field ASR models 222(*b*) may be configured to user a second, relatively lower recognition score confidence threshold due to the reduced interference in the remote device audio signal 212.

The far-field and near-field NLU models 224(*a*) and 224(*b*) may be designed to account for different ways that users may speak when using either the base device 102 or the handheld device 104. When using the base device 102, for example, users may tend to speak as if speaking to another person, in a relaxed and conversational style. When using the handheld device 104, however, users may tend to use a more command-like manner and speaking style, with shorter sentences and different syntax. The NLU models 224(*a*) and 224(*b*) may be designed to account for such differences.

The far-field and near-field dialog models 226(*a*) and 226 (*b*) may be designed to account for different situations and acoustic environments that may exist when the user is using either the base device 102 or the handheld device 104. For example, it may be assumed that the user choses to user the handheld device 104 when in a noisy environment, and the near-field dialog models 226(*b*) may be configured to use a type of dialog that is suitable for such an environment. Conversely, it may be assumed that the user choses to user the base device 102 when the environment is more quiet, and the far-field dialog models 226(*a*) may be configured to use a type of dialog that is suitable for this quieter type of environment. Generated speech may be worded or phrased differently, for example, depending on whether the user has chosen to speak into the base device 102 or the handheld device 104.

The far-field and near-field TTS models 228(*a*) and 228(*b*) may similarly be designed to account for different acoustic environments that may occur when the user is using either the base device 102 or the handheld device 104. As an example, the far-field TTS models 228(*a*) may be designed to provide normal speech and the near-field TTS models 228(*b*) may be designed to provide louder speech, under the assumption that the environment is noisier when the user chooses to use the handheld device 104.

Figure 3:
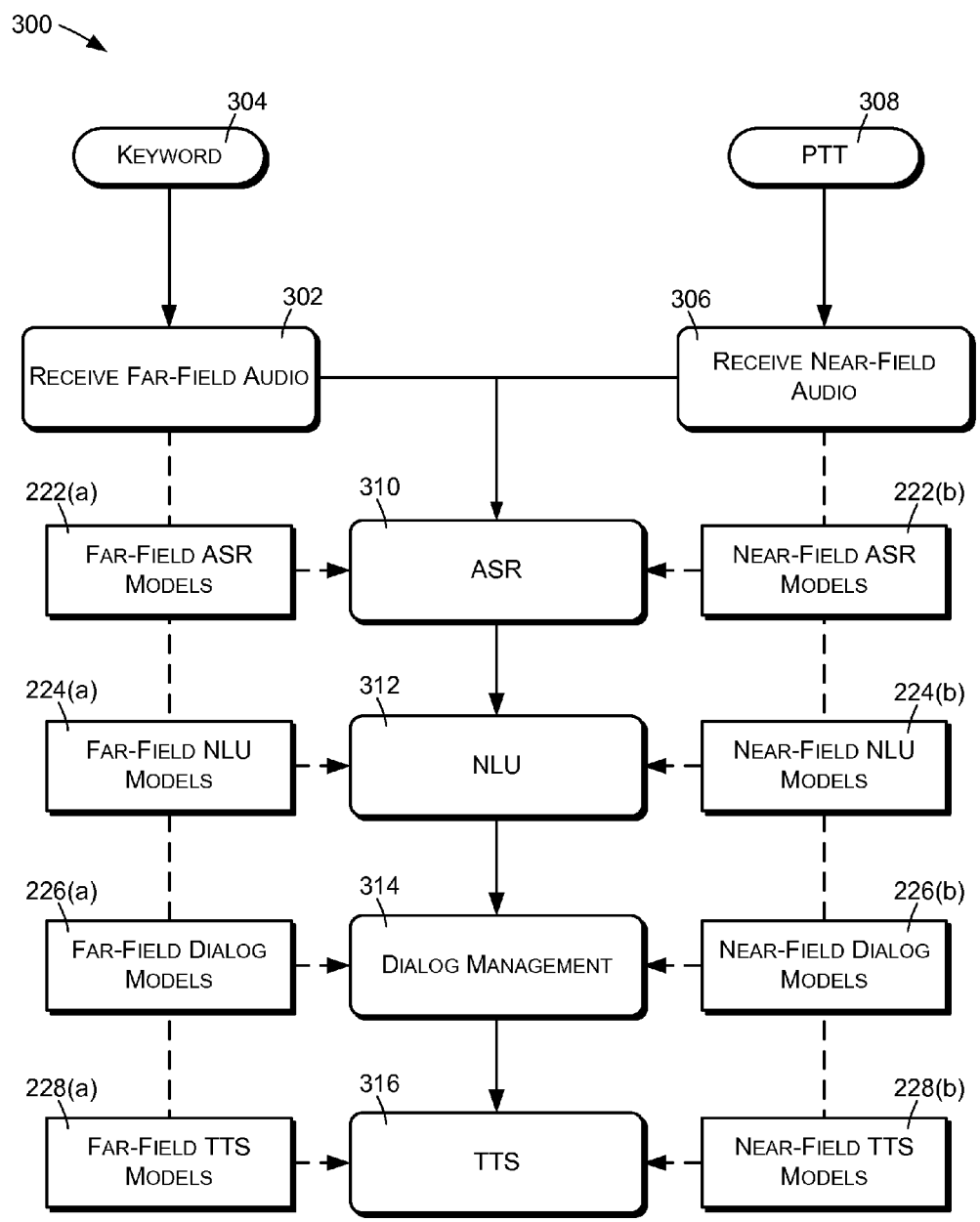
FIG. 3 a flow diagram illustrating an example process of performing various speech-related tasks in response to near-field and far-field audio sources.

FIG. 3 illustrates an example process or technique 300 for interacting with a user through a base device that is designed to operate from a fixed or stationary location and a handheld device that is associated with the base device and that is designed for handheld use at a moveable location that is remote from the base device.

An action 302 comprises receiving a first audio signal that has been captured or provided in response to a user speaking a keyword 304. The first audio signal may comprise far-field audio captured by one or more far-field microphones of the base device, into which a user speaks from a first, relatively far distance. The far-field audio may contain a relatively high level of non-voice noise or interference.

An action 306 comprises receiving a second audio signal that has been captured or provided by the handheld device in response to a PTT actuation 308 by a user. The second audio signal may comprise near-field audio captured a microphones the handheld device, into which a user speaks from a second distance that is smaller than the first distance. The second audio contains a relatively lower level of non-voice noise or interference in comparison to the first audio.

The far-field audio signal and the near-field audio signal may be provided to and received by a speech service that performs subsequent actions of FIG. 3. In some implementations, only one or the other of the far-field audio signal and the near-field audio signal is provided to the speech service at any given time, depending on whether the user has spoken the keyword 304 or performed a PTT actuation 308. The subsequent actions shown in FIG. 3 may therefore be performed with respect to either the far-field audio signal or the near-field audio signal, depending on which is being received at the time. The far-field audio signal and the near-field audio signal may be provided and received as data streams over a wide-area network such as the Internet.

An action 310 comprises performing automatic speech recognition on the far-field audio signal and/or the near-field audio signal using either a far-field ASR model 222(*a*) or a near-field ASR model 222(*b*) to recognize user speech in the far-field audio signal or the near-field audio signal. The far-field ASR model 222(*a*) is used when recognizing speech in the far-field audio signal and the near-field ASR model 222(*b*) is used when recognizing speech in the near-field audio signal. The far-field ASR model 222(*a*) may comprise an ASR model that was trained using far-field audio signals and the near-field ASR model 222(*b*) may be an ASR model that was trained using near-field audio signals.

In some cases, the ASR models 222 may associate confidence scores or scores with potentially recognized phrases, where a phrase may comprise a word or multiple words. In the case of far-field audio, the first ASR model 222(*a*) may recognize or accept only those phrases whose recognition confidence scores exceed a first, relatively high recognition threshold, while the second ASR model 222(*b*) may recognize or accept phrases whose recognition confidence scores exceed a second, lower threshold.

An action 312 comprises performing natural language understanding (NLU) on the ASR results of the action 310. The NLU may use a far-field audio model 224(a) when the ASR results are from the far-field audio signal. The NLU may use a near-field audio model 224(b) when the ASR results are from the near-field audio signal. The far-field NLU model 224(a) may comprise an NLU model that was trained using ASR results from far-field audio signals. The near-field NLU model 224(b) may comprise an NLU model that was trained using ASR results from near-field audio signals.

An action 314 comprises conducting a dialog with the user and or generating responsive text for rendering by the base device in response to recognized user speech. Conducting the dialog or generating the responsive text may performed in accordance with a far-field dialog model 226(a) in the case where the speech is recognized from audio provided from the base device. Conducting the dialog or generating the responsive text may be performed in accordance with a near-field dialog model 226(b) in the case where the speech is recognized from audio provided from the handheld device. The far-field dialog model 226(a) is designed for use in response to speech directed by the user toward the base device 102. The near-field dialog model 226(b) is designed for use in response to speech directed by the user toward the handheld device. In some cases, the dialog models 226(a) and 226(b) may be designed for use in environments having relatively higher and lower levels of ambient noise, respectively.

An action 314 comprises performing text-to-speech conversion using a far-field TTS model 228(a) and a near-field TTS model 228(b) to generate responsive speech in response to a recognized meaning. The far-field TTS model 228(a) is used when responding to user speech directed toward the base device and for an environment having a first, relatively high level of non-voice interference. The near-field TTS model 228(b) is used when responding to user speech directed toward the handheld device and for an environment having a second, relatively lower level of non-voice interference. In some cases, the TTS models 228(a) and 228(b) may be designed for use in environments having relatively higher and lower levels of ambient noise or non-voice sounds, respectively.

Figure 4:
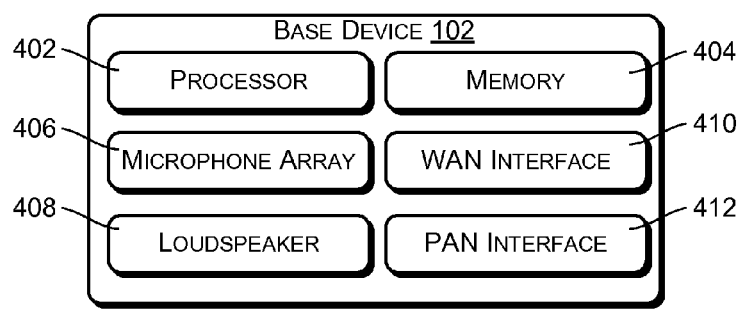
FIG. 4 is a block diagram showing relevant functional components of a base device.

FIG. 4 illustrates relevant components and logical functionality of an example base device 102. The example base device 102 has a processor 402 and memory 404. The processor 402 may include multiple processors, a processor having multiple cores, one or more digital signal processors (DSPs), and/or other types of processing components. The memory 404 may contain applications and programs in the form of instructions that are executed by the processor 402 to perform acts or actions that implement logical functionality of the base device 102. The memory 404 may be a type of non-transitory computer storage media and may include volatile and nonvolatile memory. Thus, the memory 404 may include, but is not limited to, RAM, ROM, EEPROM, flash memory, or other memory technology.

The base device 102 may have a microphone array 406 and a loudspeaker 408. The microphone array 406 may have multiple microphones or microphone elements that are spaced from each other for use in sound source localization and/or beamforming. The loudspeaker 408 may be used for producing sound within the user environment, which may include generated or synthesized speech.

The base device 102 may have a wide-area communications interface 410 configured to communicate with the speech service 108. The wide-area communications interface 410 may comprise wide-area network (WAN) interface such as an Ethernet or Wi-Fi® interface. The wide-area communications interface 410 may be configured to communicate with the speech service 108 through a public network such as the Internet.

The base device 102 may also have a personal-area network (PAN) communications interface 412 such as a Bluetooth® interface or other wireless device-to-device peripheral interface. The PAN interface 412 may be configured to receive a remote audio signal from the handheld device 104, wherein the remote audio signal contains speech utterances of the user 106 as captured by a microphone of the handheld device 104.

Figure 5:
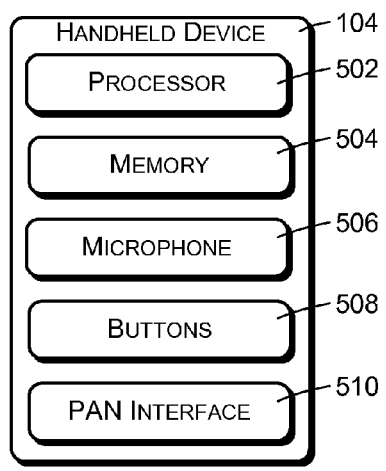
FIG. 5 is a block diagram showing relevant functional components of a handheld device.

FIG. 5 illustrates examples of relevant logical or functional components of the handheld device 104. The handheld device may comprise a processor 502 and memory 504. The memory 504 may contain applications and programs in the form of instructions that are executed by the processor 502 to perform acts or actions that implement logical functionality of the handheld device 104. The memory 504 may be a type of non-transitory computer storage media and may include volatile and nonvolatile memory. Thus, the memory 504 may include, but is not limited to, RAM, ROM, EEPROM, flash memory, or other memory technology.

The handheld device 104 may have a microphone 506 that can be held near the mouth of a user to capture user utterances and speech. The microphone 506 generates a remote audio signal that is provided to the base device 102. The remote audio signal contains utterances of the user captured or received by the remote microphone 506.

The handheld device 104 may have one or more buttons or keys 508, such as media control buttons for example. The buttons 508 may include a push-to-talk button that the user presses when speaking into the handheld device 104. The push-to-talk button may be used as an indication that the handheld device is to capture audio using the remote microphone 506 and to stream or otherwise provide the audio to the base device 102.

The handheld device 104 may also have a personal-area network (PAN) interface 510 such as a Bluetooth® interface or other wireless device-to-device peripheral interface. The PAN interface 510 may be configured to provide an audio signal to the base device 102, wherein the audio signal contains speech utterances of the user 106.

Both the base device 102 and the handheld device 104 may have other components, including other hardware and software components, that are not shown in FIGS. 4 and 5.

Figure 6:
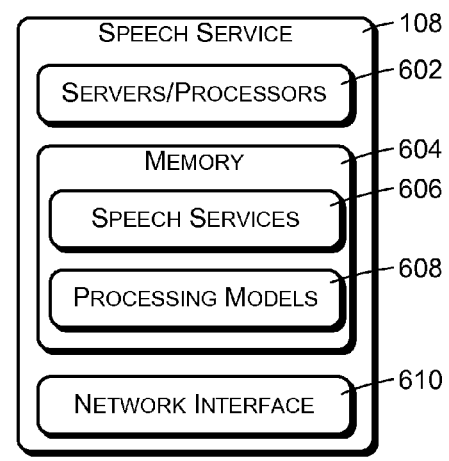
FIG. 6 is a block diagram showing relevant functional components of a speech service.

FIG. 6 illustrates examples of relevant logical or functional components of the speech service 108. The speech service 108 includes operational or control logic, which may comprise one or more servers, computers, and/or processors 602. The control logic includes memory 604 containing applications, programs, and/or other software in the form of instructions that are executed by the servers or processor 602 to perform acts or actions that implement desired functionality of the speech service 108, including the functionality described herein. The memory 604 may be a type of non-transitory computer-readable storage media and may include volatile and nonvolatile memory. Thus, the memory 604 may include, but is not limited to, RAM, ROM, EEPROM, flash memory, magnetic media, optical media, or other memory technology. The memory 604 may also include media commonly used for transferring or distributing software, such as CD-ROMs, DVDs, flash drives, memory sticks, etc.

Among other logical and physical components not specifically shown, software of the speech service 108 may include speech services 606, which may include ASR, NLU, dialog management, and text-to-speech conversion. The memory 604 may also contain or store the various processing models shown by and described with reference to FIGS. 2 and 3. Servers of the speech service 108 may also have network interfaces 610 for communicating with multiple base devices 102 and handheld devices 104.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a base device configured to operate from a fixed location to capture far-field audio containing first user speech in response to a user speaking a keyword;
a handheld device configured to operate from a moveable location to capture near-field audio containing second user;
a speech service configured to perform acts comprising:
receiving a first audio signal from the base device, the first audio signal corresponding to the far-field audio;
performing automatic speech recognition (ASR) on the first audio signal using a first ASR model to obtain first ASR results, wherein the first ASR model was trained using far-field audio signals;
receiving a second audio signal from the handheld device, the second audio signal corresponding to the near-field audio;
performing ASR on the near-field audio using a second ASR model to obtain second ASR results, wherein the second ASR model was trained using near-field audio signals;
performing natural language understanding (NLU) on the first ASR results using a first NLU model to determine a first meaning of the first user speech, wherein the first NLU model was trained using ASR results from far-field audio signals;
performing NLU on the second ASR results using a second NLU model to determine a second meaning of the second user speech, wherein the second NLU model was trained using ASR results from near-field audio signals.

2. The system of claim 1, the acts further comprising:
generating first responsive text using a first dialog model in response to the first meaning; and
generating second responsive text using a second dialog model in response to the second meaning;
wherein the second dialog model is different from the first dialog model.

3. The system of claim 1, the acts further comprising:
generating first responsive speech in response to receiving the far-field audio using a first text-to-speech (TTS) model;
generating second responsive speech in response to receiving the near-field audio using a second TTS model;
wherein the second TTS model is different from the first TTS model.

4. The system of claim 1, wherein:
performing ASR on the first audio signal is based at least in part on a first recognition confidence score threshold; and
performing ASR on the second audio signal is based at least in part on a second recognition confidence score threshold.

5. One or more non-transitory computer-readable media maintaining instructions executable by one or more processors to perform acts comprising:

receiving a first audio signal from a first device, wherein the first audio signal contains first user speech, wherein the first audio signal is captured by one or more microphones of the first device;
receiving a second audio signal from the first device, wherein the second audio signal contains second user speech, the second audio signal is captured by one or more microphones of a second device, and the second audio signal is provided by the second device to the first device;
performing automatic speech recognition (ASR) on the first audio signal using a first ASR model to recognize the first user speech; and
performing ASR on the second audio signal using a second ASR model to recognize the second user speech, wherein the second ASR model is different from the first ASR model.

6. The one or more non-transitory computer-readable media of claim 5, wherein:
the first ASR model was trained using audio signals received through a first communications channel; and
the second ASR model was trained using audio signals received through a second communications channel.

7. The one or more non-transitory computer-readable media of claim 5, wherein:
the first ASR model was trained using far-field audio signals; and
the second ASR model was trained using near-field audio signals.

8. The one or more non-transitory computer-readable media of claim 5, wherein the first device is configured to operate from a fixed location and the second device is configured to be hand held.

9. The one or more non-transitory computer-readable media of claim 5, the acts further comprising:
performing natural language understanding (NLU) using a first NLU model to determine a first meaning of the first user speech;
performing NLU using a second NLU model to determine a second meaning of the second user speech;
wherein the second NLU model is different from the first NLU model.

10. The one or more non-transitory computer-readable media of claim 5, the acts further comprising:
generating first responsive text using a first dialog model in response to the first user speech;
generating second responsive text using a second dialog model for in response to the second user speech;
wherein the second dialog model is different from the first dialog model.

11. The one or more non-transitory computer-readable media of claim 5, the acts further comprising:
generating first responsive speech in response to the first user speech using a first text-to-speech (TTS) model;
generating second responsive speech in response to the second user speech using a second text-to-speech (TTS) model;
wherein the second TTS model is different from the first TTS model.

12. The one or more non-transitory computer-readable media of claim 5, wherein:
performing ASR on the first audio signal is based at least in part on a first recognition confidence score threshold; and
performing ASR on the second audio signal is based at least in part on a second recognition confidence score threshold.

13. The one or more non-transitory computer-readable media of claim 5, the acts further comprising communicating over a wide-area network to receive the first and second audio.

14. The one or more non-transitory computer-readable media of claim 5, the acts further comprising receiving an indicator of whether the first audio is being received or the second audio is being received.

15. The one or more non-transitory computer-readable media of claim 5, wherein:
performing ASR using the first ASR model to recognize the first user speech is performed in response to the user speaking a keyword; and
performing ASR using the second ASR model to recognize the second user speech is performed in response to the user actuating an actuator.

16. A method comprising:
receiving a first audio signal captured by one or more microphones of a base device, wherein the first audio signal contains first user speech;
receiving a second audio signal from a handheld device associated with the base device, wherein the second audio signal is captured by one or more microphones of the second device, and wherein the second audio signal contains second user speech;
performing automatic speech recognition (ASR) on the first audio signal using a first ASR model to recognize the first user speech; and
performing ASR on the second audio signal using a second ASR model to recognize the second user speech, wherein the second ASR model is different from the first ASR model.

17. The method of claim 16, wherein:
the first ASR model was trained using audio received through a first communications channel; and
the second ASR model was trained for audio received through a second communications channel.

18. The method of claim 16, wherein:
the first ASR model was trained using far-field audio signals; and
the second ASR model was trained using near-field audio signals.

19. The method of claim 16, further comprising:
performing natural language understanding (NLU) using a first NLU model to determine a first meaning of the first user speech;
performing NLU using a second NLU model to determine a second meaning of the second user speech;
wherein the second NLU model is different from the first NLU model.

20. The method of claim 16, further comprising:
generating first responsive text using a first dialog model in response to the first user speech;
generating second responsive text using a second dialog model in response to the second user speech;
wherein the second dialog model is different from the first dialog model.

21. The method of claim 16, further comprising:
generating first responsive speech in response to the first user speech using a first text-to-speech (TTS) model;
generating second responsive speech in response to the second user speech using a second text-to-speech (TTS) model;
wherein the second TTS model is different from the first TTS model.

22. The method of claim 16, wherein:
performing ASR on the first audio signal is based at least in part on a first recognition confidence score threshold;
performing ASR on the second audio signal is based at least in part on a second recognition confidence score threshold.

23. The method of claim 16, further comprising communicating over a wide-area network to receive the first and second audio.

* * * * *

UNITED STATES PATENT AND TRADEMARK OFFICE
CERTIFICATE OF CORRECTION

PATENT NO. : 9,293,134 B1
APPLICATION NO. : 14/502103
DATED : March 22, 2016
INVENTOR(S) : Saleem et al.

It is certified that error appears in the above-identified patent and that said Letters Patent is hereby corrected as shown below:

In the Claims

Claim 1, column 11, line 18, add "speech" following "user".

Signed and Sealed this
Fifth Day of July, 2016

Michelle K. Lee
*Director of the United States Patent and Trademark Office*